(12) United States Patent
Tian et al.

(10) Patent No.: US 11,897,434 B2
(45) Date of Patent: Feb. 13, 2024

(54) VEHICLE-MOUNTED BICYCLE STAND

(71) Applicant: NINGBO TOGETHER TRADING CO., LTD., Zhejiang (CN)

(72) Inventors: Huike Tian, Zhejiang (CN); Kejin Xia, Zhejiang (CN)

(73) Assignee: NINGBO TOGETHER TRADING CO., LTD., Ningbo (CN)

( * ) Notice: Subject to any disclaimer, the term of this patent is extended or adjusted under 35 U.S.C. 154(b) by 0 days.

(21) Appl. No.: 17/730,160

(22) Filed: Apr. 26, 2022

(65) Prior Publication Data
US 2023/0294614 A1 Sep. 21, 2023

(30) Foreign Application Priority Data

Jan. 27, 2022 (CN) .......................... 202210100089.3
Jan. 27, 2022 (CN) .......................... 202220231723.2

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .................................... B60R 9/06; B60R 9/10
USPC ...................................................... 224/502
See application file for complete search history.

(56) References Cited

U.S. PATENT DOCUMENTS

| | | | | |
|---|---|---|---|---|
| 6,644,525 B1* | 11/2003 | Allen | ........................ | B60R 9/06 224/532 |
| 8,387,839 B2* | 3/2013 | Sautter | ...................... | B60R 9/10 224/532 |
| 9,376,063 B2* | 6/2016 | Hein | ......................... | B60R 9/06 |
| 10,793,079 B1* | 10/2020 | Shen | ...................... | B60D 1/241 |
| 10,906,473 B1* | 2/2021 | Yu | ............................. | B60R 9/06 |
| 10,988,088 B1* | 4/2021 | Liu | ............................ | B60R 9/06 |
| 2007/0145088 A1* | 6/2007 | Depot | ....................... | B60R 9/06 224/532 |
| 2009/0120986 A1* | 5/2009 | Sautter | ...................... | B60R 9/06 224/532 |
| 2016/0250976 A1* | 9/2016 | Ammirati | ............. | B60R 9/0485 224/502 |
| 2017/0349110 A1* | 12/2017 | Bass | ......................... | B60R 9/10 |
| 2019/0161022 A1* | 5/2019 | McFadden | ................ | B60R 9/10 |
| 2019/0351837 A1* | 11/2019 | Murray | .................... | B60D 1/46 |
| 2019/0389395 A1* | 12/2019 | Viklund | .................... | B60R 9/06 |
| 2021/0300257 A1* | 9/2021 | Shen | ......................... | B60R 9/06 |
| 2021/0370841 A1* | 12/2021 | Wang | ....................... | B60R 9/10 |
| 2022/0266762 A1* | 8/2022 | Bowe | ....................... | B60R 9/10 |

* cited by examiner

*Primary Examiner* — Peter N Helvey

(57) ABSTRACT

The disclosure provides a vehicle-mounted bicycle stand, including a mounting seat, a support rod, a bracket and a locking and fixing mechanism, wherein the mounting seat is connected with a square-opening base at a rear end of a vehicle, and a connecting part is arranged at an end of the mounting seat; the support rod is fixed on the mounting seat; the bracket is rotationally mounted at an upper end of the support rod and is configured to place a bicycle; and the locking and fixing mechanism is mounted between the support rod and the bracket and is configured to lock and fix the bracket in a rearward unfolded state or a downward folded state. The vehicle-mounted bicycle stand of the disclosure is compact in structure, convenient and labor-saving in mounting and dismounting, high in overall structural strength, and good in reliability.

16 Claims, 17 Drawing Sheets

VEHICLE-MOUNTED BICYCLE STAND

CROSS REFERENCE TO RELATED APPLICATIONS

The present application claims the benefit of Chinese Patent Application Nos. 202210100089.3 and 202220231723.2 filed on Jan. 27, 2022. All the above are hereby incorporated by reference in their entirety.

TECHNICAL FIELD

The disclosure relates to a vehicle-mounted stand, and particularly relates to a vehicle-mounted bicycle stand.

BACKGROUND

At present, there are generally two types of fixing a bicycle on a vehicle, namely a vehicle top fixing type and a rear fixing type. The vehicle top fixing type inevitably increases the height of the entire vehicle. When the vehicle runs in the wild, the bicycle is easy to scrape with trees on the top, resulting in damage to a fixing device and falling of the bicycle. Due to a high arrangement position of the top fixing type, the bicycle is very inconvenient to take, and the device is very inconvenient to maintain and mount. Although the rear fixing type can solve the above technical problems of the vehicle top fixing type, the traditional rear fixing type is affected by an entire fixed support structure which cannot be folded in an idle state, so that a large space is occupied. Furthermore, the rear fixing type does not have an adjusting function and can only adapt to some bicycles of a single form or model, and the rear fixing type does not have a rotating function, so it is inconvenient to mount and dismount the bicycle.

SUMMARY

[1] Technical Problem to be Solved

The technical problem to be solved by the disclosure is to provide a vehicle-mounted bicycle stand which is compact in structure, is convenient to mount and can be quickly unfolded or folded.

[2] Technical Solutions for Solving the Problem

A vehicle-mounted bicycle stand includes:
a mounting seat 1 connected with a square-opening base at a rear end of a vehicle, wherein a connecting part is arranged at an end of the mounting seat 1;
a support rod vertically fixed on the mounting seat 1;
a bracket 5 rotationally mounted at an upper end of the support rod and configured to place a bicycle; and
a locking and fixing mechanism mounted between the support rod and the bracket 5 and configured to lock and fix the bracket 5 in a rearward unfolded state or a downward folded state.

Further, the connecting part includes an insertion rod 11, a support block 13 and a screw rod 15; the insertion rod 11 is arranged horizontally forward and can be inserted into the square-opening base at the rear end of the vehicle, a support plate 12 is fixed on a side wall of an end of the insertion rod 11, the support block 13 is located at the end of the insertion rod 11, a contact surface between the support block 13 and the end of the insertion rod 11 is an inclined surface, screw holes for allowing the screw rod 15 to pass through are penetrated in the support block 13, a head of the screw rod 15 passes through the insertion rod 11 forward and extends to the outside of the mounting seat 1, and a tightening part 16 is fixed at an end of the screw rod; and when the tightening part 16 is rotated, the screw rod 15 can be driven to rotate, and the support block 13 can move forward and away from the support plate 12, so that the connecting part is tensioned and fixed in the square-opening base.

Further, a cross section of the support plate 12 is L-shaped, and an intersecting line of the inclined surface and a side wall of the support plate 12 is inclined to a length direction of the support plate 12.

Further, included angles between intersecting lines of the inclined surface and two side walls of the support plate 12 and the length direction of the support plate are the same.

Further, a tail of the screw rod 15 is provided with a limiting protrusion 151 for preventing the support block 13 from being detached.

Further, the locking and fixing mechanism includes a main shaft, a shift block 42 and a slide block 44; the main shaft is rotationally mounted at the upper end of the support rod, the main shaft is rigidly connected with a limiting plate 43, two ends of the main shaft are bent to the same side to form the bracket 5, and an end of the limiting plate 43 is provided with a clamping slot 430 with an opening facing away from the main shaft; the shift block 42 is rotationally mounted on a top of the support rod, the shift block 42 is connected with the slide block 44 in vertical slide fit with a lower end of the main shaft, and the slide block 44 can be driven to slide up and down through the rotation of the shift block 42; when the limiting plate 43 is rotated to a lower limit position, a clamping block 441 arranged on the slide block 44 can be clamped in the clamping slot 430 to realize the locking of the bracket in an unfolded state; and the locking and fixing mechanism is provided with a first elastic component for enabling the shift block 42 to have a trend of rotating rearward and driving the slide block 44 to move upward, or enabling the slide block 44 to have a trend of moving upward and driving the shift block 42 to rotate rearward.

Further, a rotation axis of the shift block 42 is parallel to a rotation axis of the main shaft, clamping hooks 424 are arranged at a rear end of the shift block 42, the first elastic component enables the clamping hooks 424 to have a trend of moving downward, and limiting bosses 432 are arranged on side walls of the limiting plate 43; and when the bracket 5 is rotated to a folded state, the limiting plate 43 is rotated to a rear limit position, and the limiting bosses 432 are hooked by the clamping hooks to realize the locking of the main shaft.

Further, an end of the limiting plate 43 is provided with an inclined guide surface 431 configured to be in contact with the clamping block 441 and push the slide block to move down.

Further, the locking and fixing mechanism further includes a fixing seat 41 fixed at the upper end of the hollow support rod, the shift block 42 is rotationally mounted on a top of the fixing seat 41, a front end of the shift block 42 is provided with connecting lugs 421, the connecting lugs 421 are hinged with a connecting holder 45, and the connecting holder 45 passes through the fixing seat 41 downward and then is hinged with the slide block 44.

Further, a support seat 21 is fixed at a bottom of the support rod, the support seat 21 is rotationally mounted on a connecting rod 14 on the mounting seat 1, a rotation direction of the support seat 21 faces an unfolded direction of the bracket 5, the support seat 21 is elastically connected with a clamping pin 231 and a second elastic component for enabling the clamping pin 231 to have a trend of moving towards the connecting rod 14, and the connecting rod 14 is provided with a pin hole 141 for insertion of the support rod when the support rod is rotated to a vertical state.

Further, the clamping pin 231 is mounted on a top of the support seat 21, a sliding direction of the clamping pin is parallel to a length direction of the support rod, and a top of the clamping pin 231 is provided with a pull block 23 for shifting the clamping pin to move upward to enable the clamping pin to be detached from the pin hole 141 formed in a top of the connecting rod 14.

Further, a limiting component for limiting a rearward rotation angle of the support rod is arranged between the connecting rod 14 and the support seat 21 or the support rod.

Further, a top plate is fixed on the top of the connecting rod 14, the pin hole 141 is formed in the top plate, one end of the top plate extends rearward and forms a first limiting part 142, and the support rod or the support seat 21 is provided with a limiting slot 200 for allowing the first limiting part to be inserted and limiting a rotation angle.

Further, the rotation angle of the support rod is greater than or equal to 10 degrees and less than or equal to 60 degrees.

Further, the length of the support rod is adjustable, the support rod includes a lower support rod 2 and an upper support rod 3, and the upper support rod is sleeved on the lower support rod 2 and fixed through a locking bolt.

Further, a cross section of the support rod is rectangular.

Further, the connecting holder 45 is of a frame-shaped holder structure formed by bending steel wires.

[3] Beneficial Effects

In the vehicle-mounted bicycle stand of the disclosure, by arranging a support block and a support plate, the tensioning force is large, the connection is stable and reliable, and the bicycle stand can be reliably mounted on the square-opening base at the rear end of the vehicle; by the operation of a screw rod and a tightening part arranged at the front end, the operation is convenient and labor-saving, and a self-locking function is realized; by a bent support rod structure, when a bicycle is mounted or dismounted, the support rod is rotated rearward, so that the height of the bicycle is reduced, the operation space is increased, the mounting and dismounting of the bicycle are convenient, and the mounting and dismounting of the bicycle are more labor-saving; by a telescopic support rod structure, the height of the support rod can be adjusted according to needs to adapt to bicycles of different specifications and sizes, so that the application scope is wide; by arranging a limiting structure, the support rod is prevented from exceeding a stroke during rotation to improve safety and reliability, and the bicycle is prevented from directly hitting the ground due to gravity when the support rod is rotated; a foldable bracket structure is folded when the bicycle is not placed, so that the occupied space is reduced; a locking and fixing mechanism is arranged to lock and fix the bracket in an unfolded state or a folded state to avoid rotation, so that the safety and reliability during running are improved; and by arranging a shift block structure, the operation is convenient and labor-saving, and the appearance is beautiful. The vehicle-mounted bicycle stand of the disclosure is compact in structure, convenient and labor-saving in mounting and dismounting, high in overall structural strength, and good in reliability.

DETAILED DESCRIPTION

Figure 1:
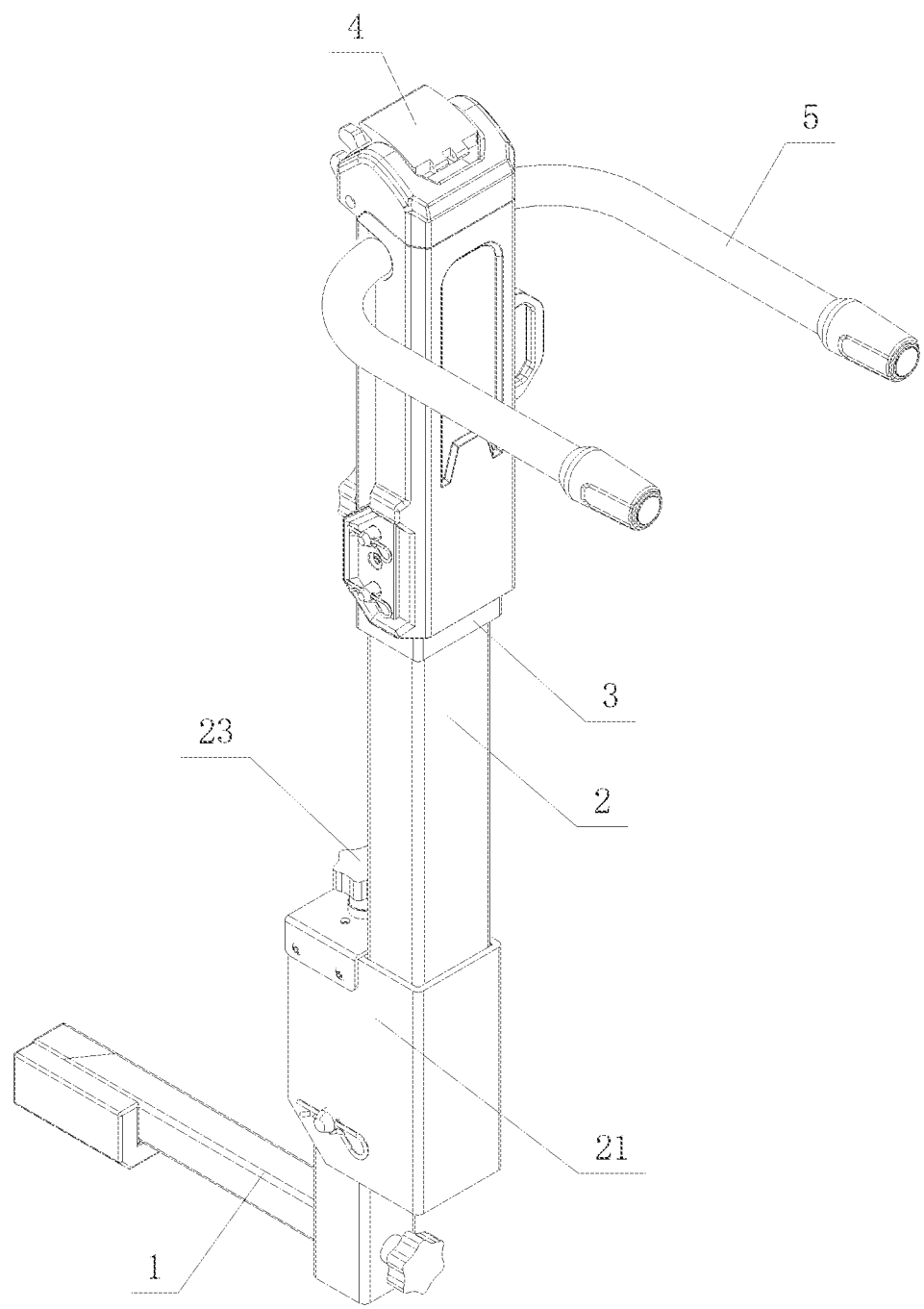
FIG. 1 is a schematic view of a vehicle-mounted bicycle stand of the disclosure in an unfolded state.
Figure 2:
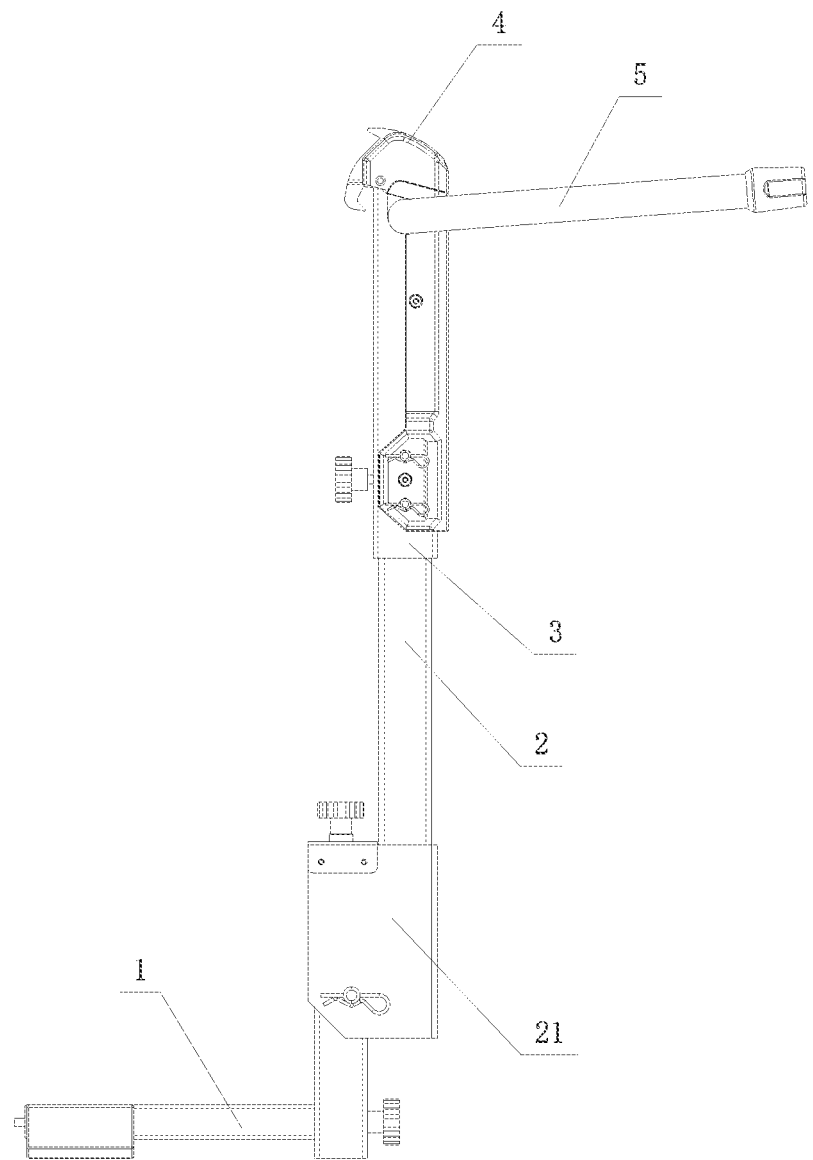
FIG. 2 is a schematic view of another perspective of the vehicle-mounted bicycle stand of the disclosure in an unfolded state.
Figure 3:
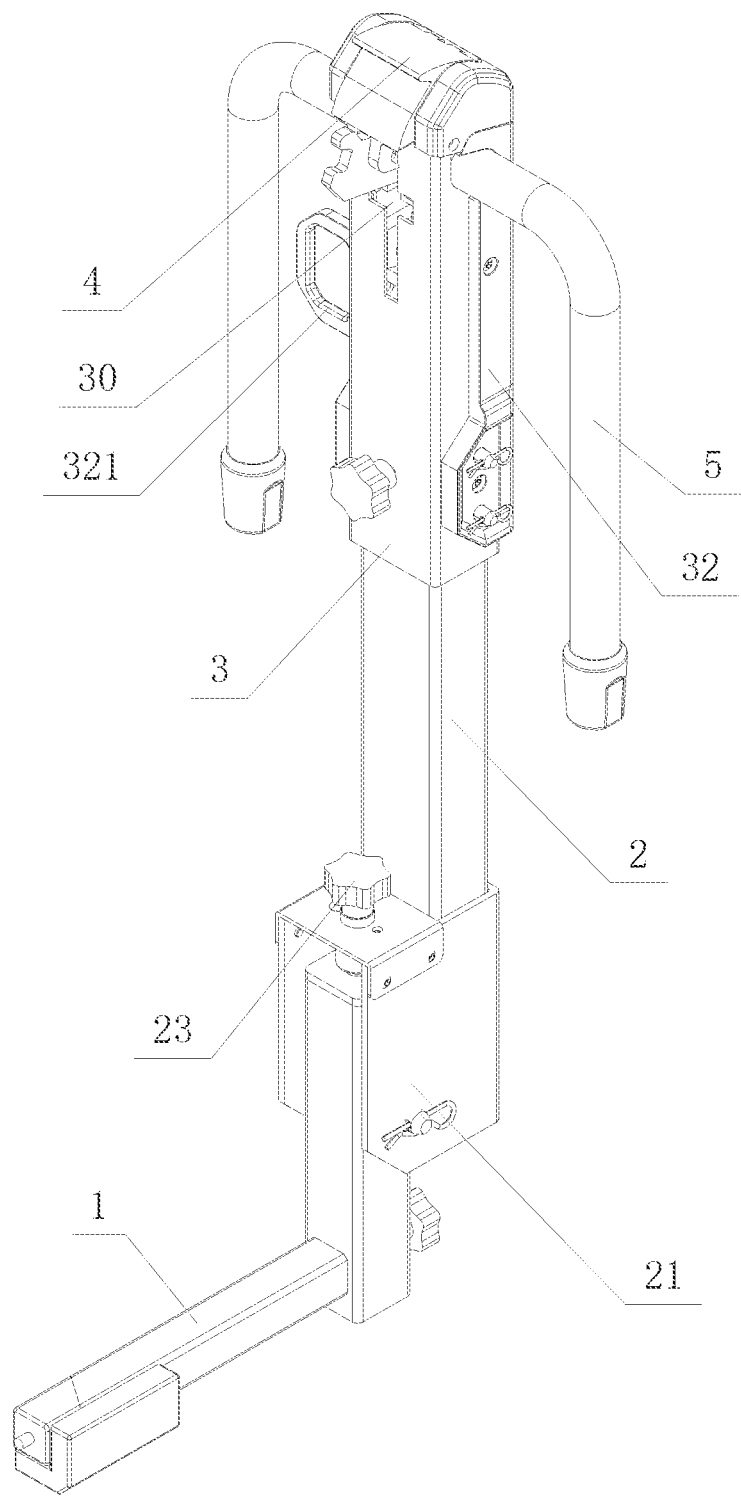
FIG. 3 is a schematic view of the vehicle-mounted bicycle stand of the disclosure in a folded state.
Figure 4:
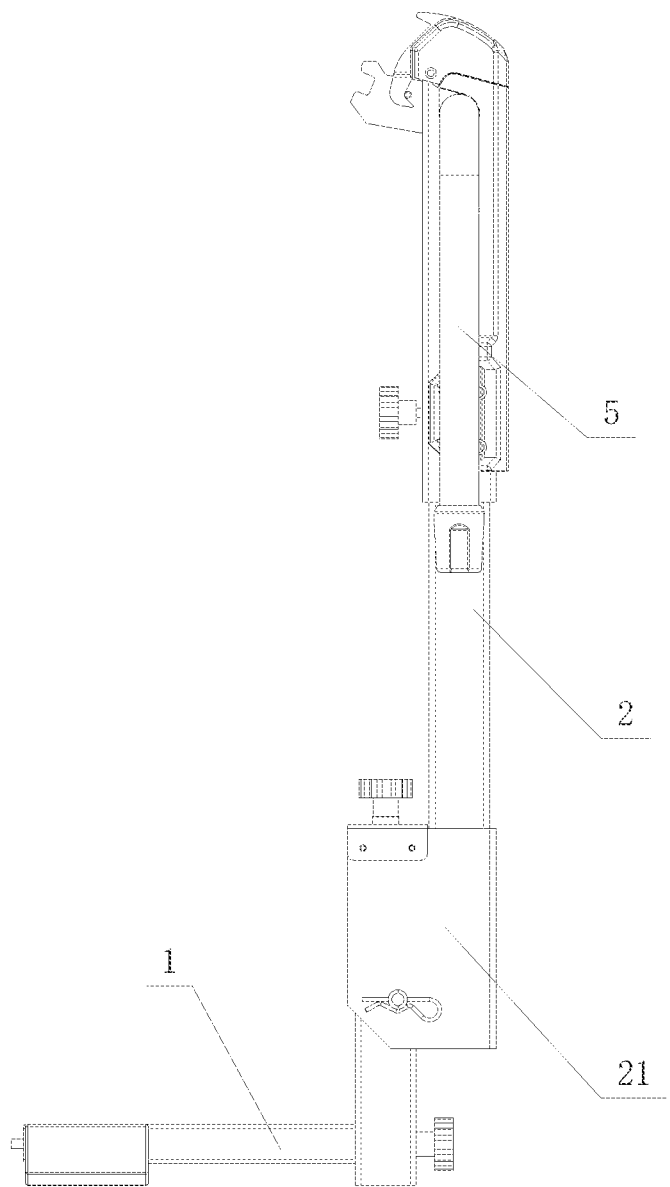
FIG. 4 is a schematic view of another perspective of the vehicle-mounted bicycle stand of the disclosure in a folded state.
Figure 5:
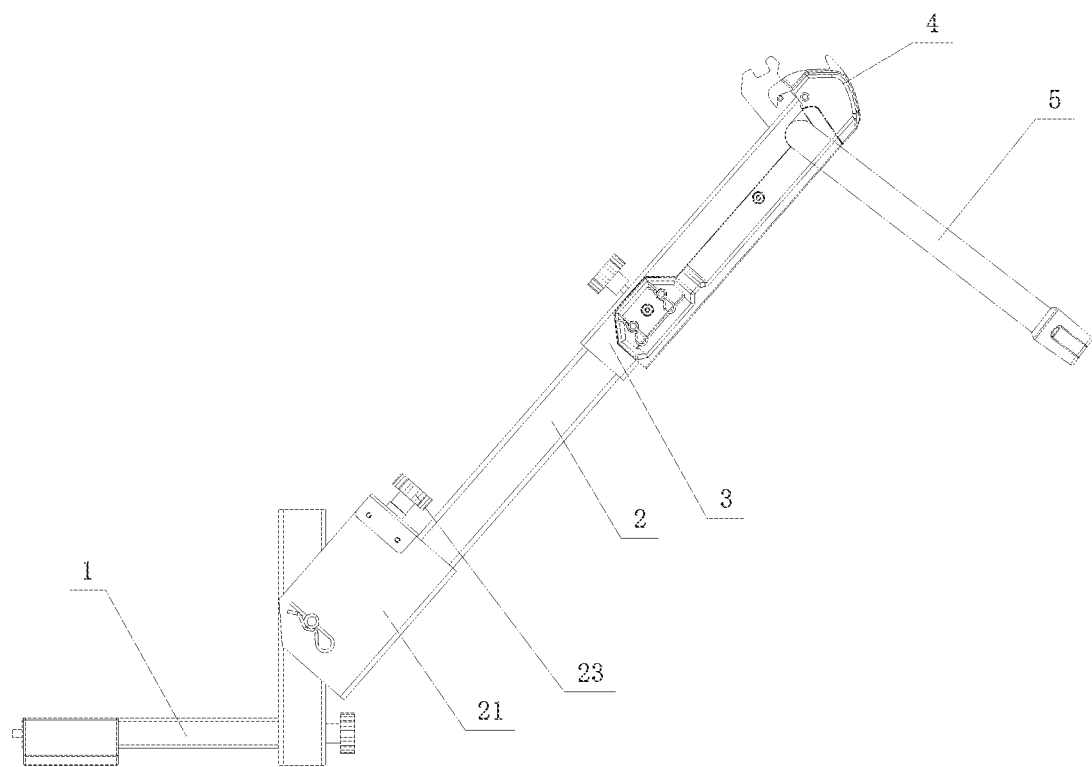
FIG. 5 is a schematic view of the vehicle-mounted bicycle stand of the disclosure in a rearward inclined state.

The examples of the disclosure will be described in detail below with reference to the accompanying drawings.

Referring to FIG. 1 to FIG. 17, a vehicle-mounted bicycle stand is mounted on a square-opening base at a rear end of a vehicle (off-road vehicle) and is configured to fix a bicycle. Main structures include a mounting seat 1, a support rod, a bracket 5 and a locking and fixing mechanism. A connecting part is arranged at an end (rear end) of the mounting seat 1 and is connected with the square-opening base at the rear end of the vehicle. The support rod is fixed on the mounting seat 1 as a support body and is configured to support the bracket 5, so that the bracket has an enough height to enable the bicycle on the bracket 5 to be detached from the ground. In this example, the support rod is perpendicular to a horizontal plane; the bracket 5 is U-shaped as a whole, rod bodies at two ends of the bracket form bracket rods for supporting a bicycle frame, and the bracket is rotationally mounted at an upper end of the support rod; a rotation axis of the bracket 5 is horizontally arranged and is perpendicular to a forward direction of the vehicle; and when the bicycle needs to be placed, the bracket needs to be unfolded rearward (away from the forward direction of the vehicle). In this example, when the bracket 5 is unfolded, an included angle between the bracket and the support rod is 90-95 degrees; when the bicycle does not need to be placed, the bracket 5 is folded, and the rod bodies on the bracket 5 are arranged downward under the action of gravity and are substantially parallel to the support rod, thereby reducing the occupied space; and the locking and fixing mechanism is mounted between the support rod and the bracket 5 and is configured to lock and fix the bracket 5 in a rearward unfolded state or a downward folded state, thereby avoiding rotation of the bracket in an unfolded state or a folded state.

The structure of each of the components in this application will be described in detail below with reference to the accompanying drawings.

Referring to FIG. 1 to FIG. 9, the connecting part at the end (front end) of the mounting seat 1 includes an insertion rod 11, a support block 13 and a screw rod 15. The insertion rod 11 is arranged horizontally forward (the forward direction of the vehicle) and can be inserted into the square-opening base at the rear end of the vehicle, the square-opening base is provided with a rearward mounting hole, and the mounting hole is rectangular. In order to improve the mounting verticality of the bicycle stand, in this example, a cross section of the insertion rod 11 is rectangular so as to avoid inclining during insertion, and a support plate 12 is fixed on a side wall of the end (front end) of the insertion rod 11. In this example, a cross section of the support plate 12 is L-shaped, two side walls of the support plate are mounted on two surfaces of the insertion rod 11 in a fitted manner, the end of the support plate 12 extends forward to the outside of the insertion rod 11, the support block 13 is located at the end (front end) of the insertion rod 11, a contact surface between the support block and the end of the insertion rod 11 is an inclined surface, screw holes are penetrated in front and rear ends of the support block 13, the screw rod 15 is in threaded connection in the screw holes, a head of the screw rod 15 passes through the hollow insertion rod 11 forward and extends to the outside of the mounting seat 1, and a tightening part 16 is fixed at the end (rear end) of the screw rod and is configured to drive the screw rod to rotate; in order to facilitate the operation, the tightening part 16 is a hand wheel or a handle; and when the tightening part 16 is rotated for tightening, the screw rod 15 can be driven to rotate, and under the acting force of threads, the support block 13 moves forward and away from the support plate 12 by the inclined guide of the inclined surface, so that the connecting part is tensioned and fixed in the square-opening base. In this example, an intersecting line of the inclined surface (the current plane) and a side wall of the support plate 12 is inclined to a length direction of the support plate 12. In order to improve a fixing effect, in this example, included angles between intersecting lines of the inclined surface and two side walls of the support plate 12 and the length direction of the support plate are the same, that is, an included angle between an intersecting line of the inclined surface and one side wall of the support plate 12 and the length direction of the support plate 12 is a, an included angle between an intersecting line of the inclined surface and another side wall of the support plate 12 and the length direction of the support plate 12 is b, and a=b. The inclined surface is combined with the L-shaped support plate 12, and the inclined surface is in contact with four inner walls on the square-opening base, thereby improving the connection strength and preventing the stand from inclining. In order to avoid the detachment of the support block 13 due to an excessive stroke when the screw rod is loosened, a limiting protrusion 151 is arranged at the end (front end) of the screw rod.

Referring to FIG. 10 to FIG. 17, the locking and fixing mechanism includes a main shaft, a shift block 42 and a slide block 44. The main shaft is rotationally mounted at the upper end of the support rod. In this example, a rotation direction of the main shaft is set horizontally and is perpendicular to the forward direction of the vehicle, a center of the main shaft is rigidly connected with a limiting plate 43, two ends of the main shaft are bent to the same side to form a bracket 5, the bracket 5 is U-shaped as a whole, the limiting plate 43 is of a rectangular plate structure as a whole and is perpendicular to a rotation axis of the bracket 5, a clamping slot 430 is arranged at an end of the limiting plate 43, and an opening direction of the clamping slot 430 faces away from the main shaft; the shift block 42 is rotationally mounted on the top of the support rod, and a rotation axis of the shift block 42 is parallel to the rotation axis of the bracket 5; the shift block 42 is connected with the slide block 44 through a connecting holder 45, and the slide block 44 is located below the main shaft and is in vertical slide fit in the support rod; the slide block 44 and the shift block 42 are linked through the connecting holder 45, that is, the slide block can be driven to move up and down through the rotation of the shift block 42, and the shift block 42 can also be driven to rotate through the up-and-down movement of the slide block; a clamping block 441 arranged upward is arranged in the clamping slot 430; and when the limiting plate 43 is rotated to a lower limit position, the bracket 5 is in an unfolded state, at this time, the clamping block 441 is clamped in the clamping slot on the limiting plate so as to realize the locking of the bracket in an unfolded state, and at this time, the bracket can not be rotated. Furthermore, a first elastic component is also provided, and the first elastic component enables the shift block 42 to have a trend of rotating rearward and driving the slide block 44 to move upward, or enables the slide block 44 to have a trend of moving upward and driving the shift block 42 to rotate rearward. In this example, the first elastic component is a torsion spring and is arranged on a hinge point of the shift block, so that the shift block has a trend of rotating rearward; two clamping hooks 424 are arranged at the rear end of the shift block 42, the clamping hooks 424 are arranged downward (rearward), and the above first elastic component enables the clamping hooks 424 to have a movement trend of rotating downward; limiting bosses 432 are symmetrically arranged on two sides of the limiting plate 43, the limiting bosses are cylindrical, and the axis of the limiting bosses is parallel to the axis of the main shaft; and when the bracket 5 is rotated to a folded state, the limiting plate 43 is rotated to a rear limit position, and at this time, the limiting bosses 432 can be hooked by the clamping hooks to realize the locking of the main shaft, thereby locking and fixing the bracket in a folded state to avoid shaking during the movement of the vehicle. For convenience of description, the direction of an arrow in FIG. 10 to FIG. 16 is the direction of the bracket.

Figure 12:
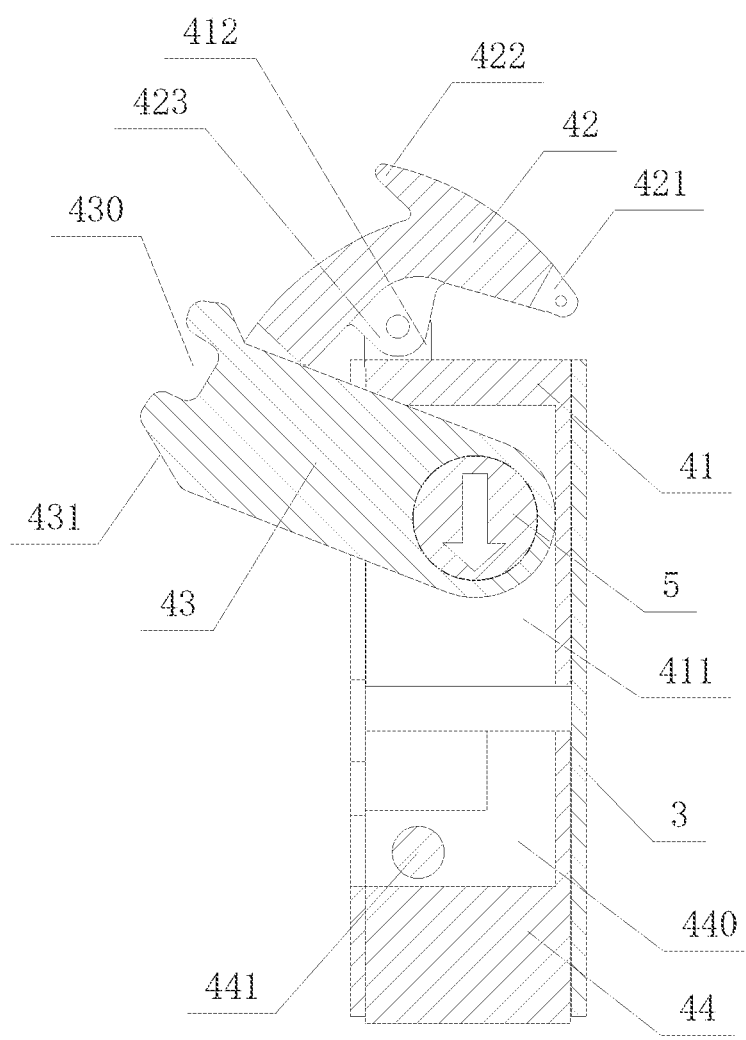
FIG. 12 is a cross-sectional view of the locking and fixing mechanism when the vehicle-mounted bicycle stand of the disclosure is folded.
Figure 13:
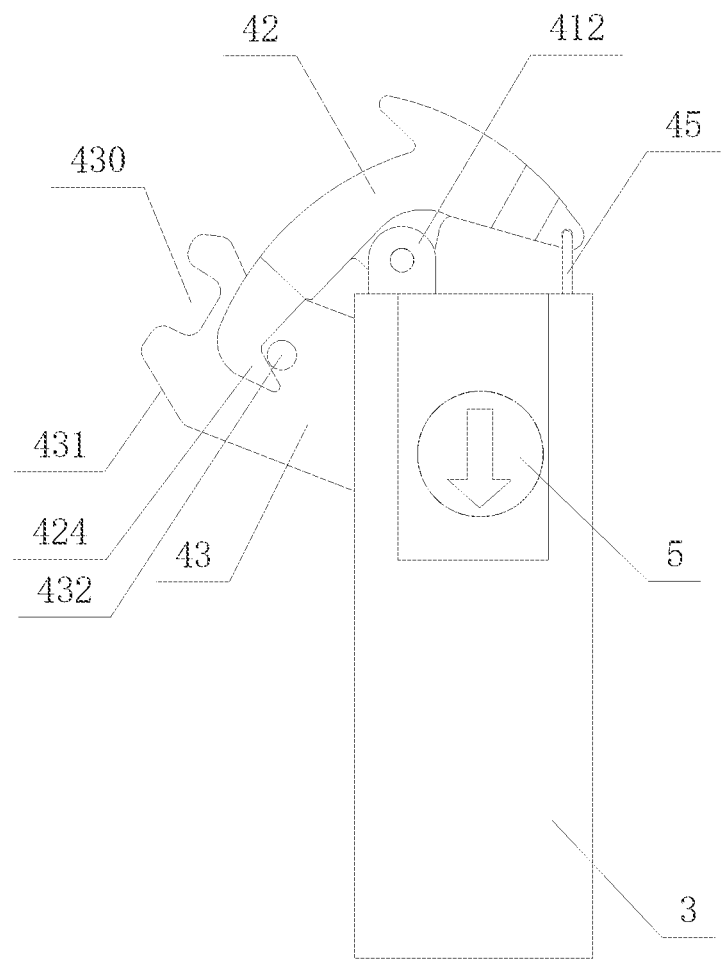
FIG. 13 is a schematic state view of clamping hooks when the vehicle-mounted bicycle stand of the disclosure is folded.
Figure 14:
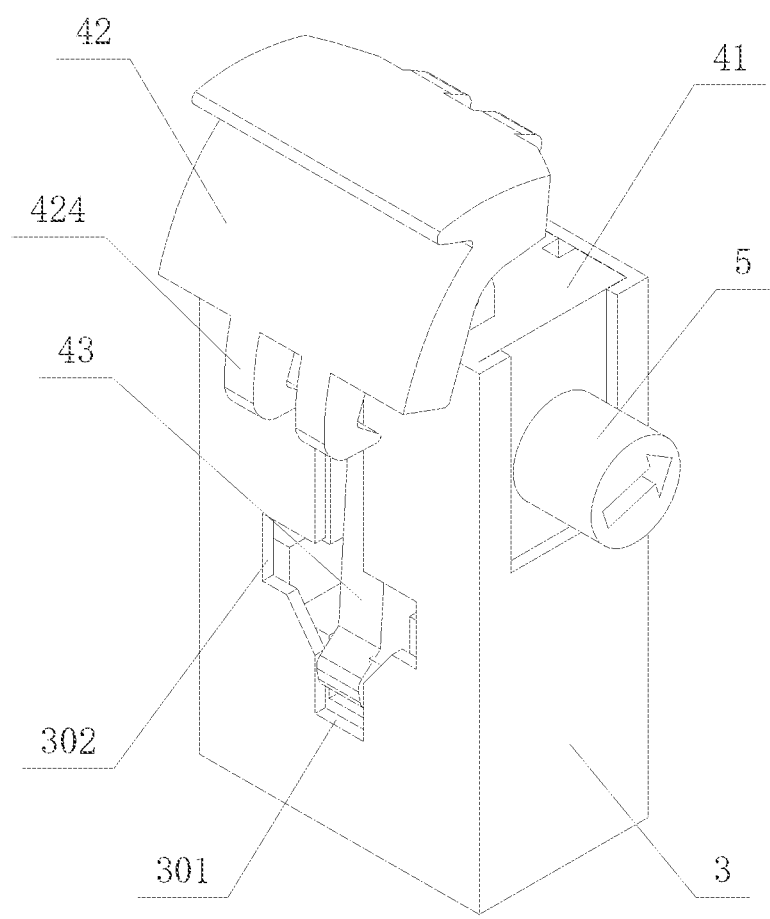
FIG. 14 is a schematic state view of the locking and fixing mechanism when the vehicle-mounted bicycle stand of the disclosure is unfolded.
Figure 15:
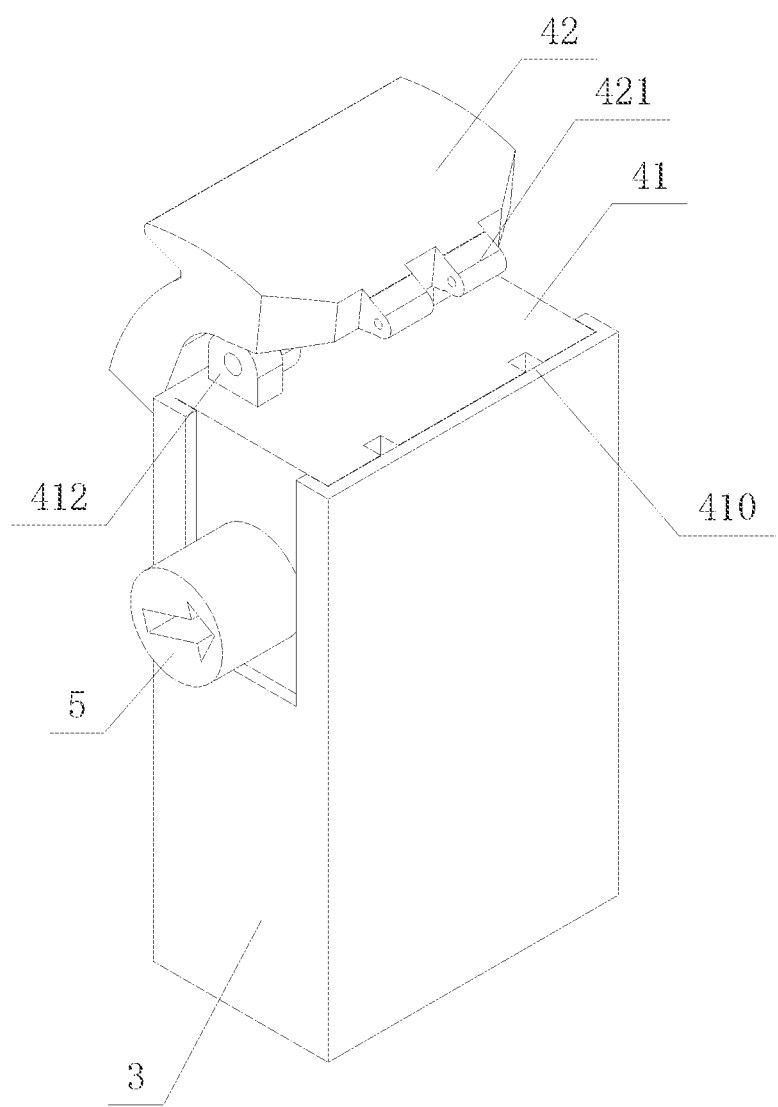
FIG. 15 is a schematic state view of another perspective of the locking and fixing mechanism when the vehicle-mounted bicycle stand of the disclosure is unfolded.
Figure 16:
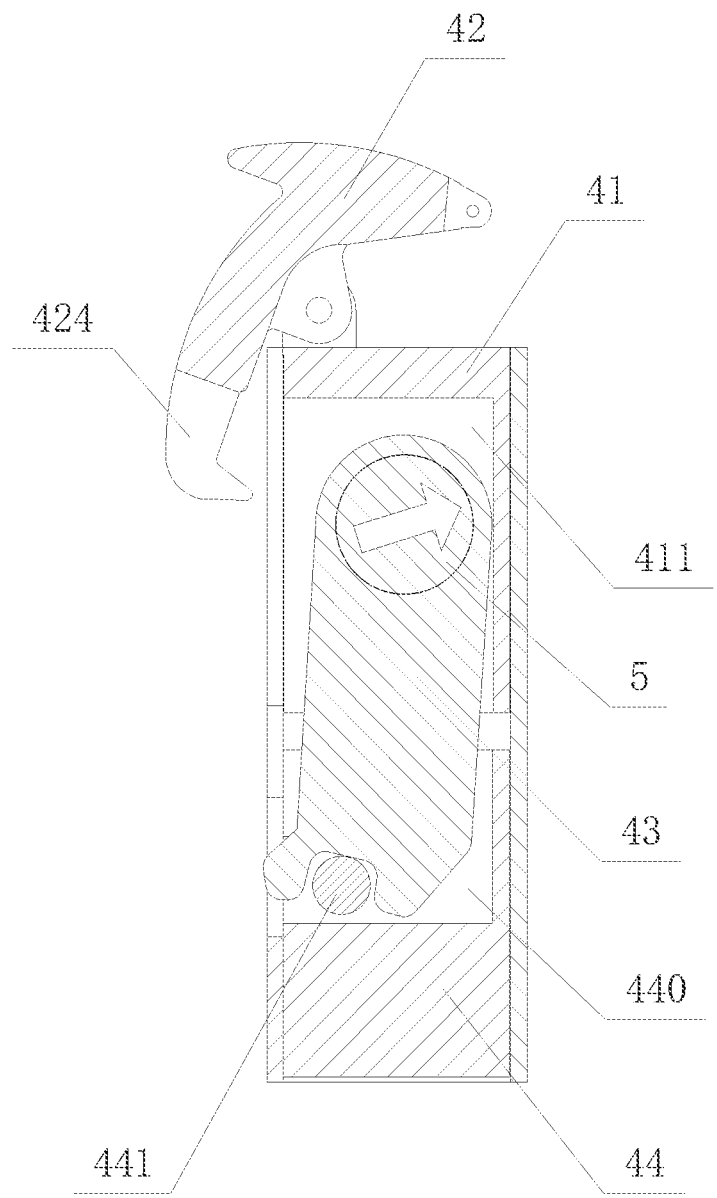
FIG. 16 is a cross-sectional view of the locking and fixing mechanism when the vehicle-mounted bicycle stand of the disclosure is unfolded.

Referring to FIG. 12, an inclined guide surface 431 is arranged at an end of the limiting plate 43; when the limiting plate 43 is rotated downward, the inclined guide surface 431 is in contact with the clamping block 441 arranged on the slide block 44, and under the pushing force of the inclined guide surface, the slide block moves downward until the clamping block 441 is clamped in the clamping slot 430 of the limiting plate; and the first elastic component enables the clamping block to be clamped in the clamping slot 430 to realize locking and fixing.

Figure 17:
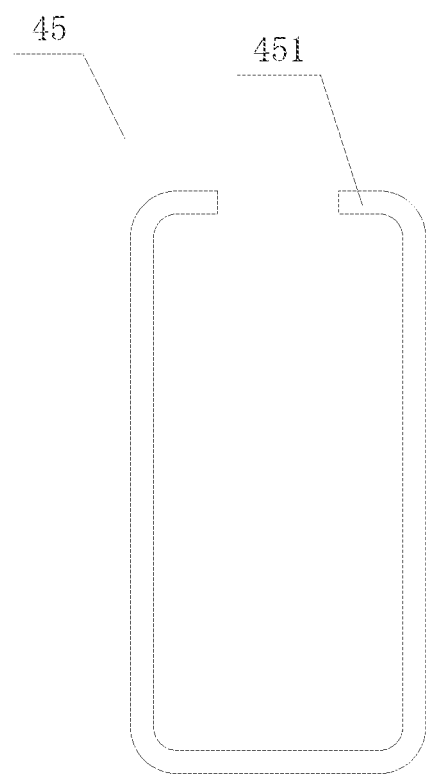
FIG. 17 is a schematic structural view of a connecting holder when the vehicle-mounted bicycle stand of the disclosure is unfolded.

In order to improve the structural strength and reduce the overall weight, in this example, the support rod adopts a hollow rectangular tube structure, and preferably is made of aluminum alloy; a fixing seat 41 is arranged on a top of the support tube, the fixing seat is a cuboid as a whole and is sleeved in the support rod, an upper end of the fixing seat is flush with the support rod, and axial fixing is realized through pins; two hinged seats 412 are arranged in parallel on a top of the fixing seat 41 near a front end, and a lower end of the shift block 42 is provided with hinged parts 423 which are respectively hinged with the two hinged seats; connecting lugs 421 are arranged at a front end of the shift block 42, and the connecting lugs 421 are hinged with a connecting holder 45; referring to FIG. 17, the connecting holder 45 is of a frame-shaped holder structure formed by bending steel wires, the connecting holder is U-shaped as a whole, the ends of the connecting holder are bent toward each other to form a connecting part 451, and the connecting part is sleeved at two ends of the connecting lugs 421, so as to realize the hinged connection with the shift block; and the fixing seat 41 is provided with holes 410 for allowing the connecting holder 45 to pass through, and the connecting holder 45 passes through the fixing seat 41 downward and then is hinged with the slide block 44, thereby realizing the linkage between the shift block and the slide block.

Two sides of the upper end of the support rod are provided with openings 303 for mounting the assembled locking and fixing mechanism and bracket 5 (main shaft).

In this example, both the fixing seat 41 and the slide block are mounted in the support rod, and the front side of the upper end of the support rod is provided with a vertically arranged slot I 301 and a horizontally arranged slot II 302; the slot I is configured to allow the limiting plate to pass through, the slot II is configured to allow the limiting bosses on the limiting plate to pass through, and the slot I and the slot II are communicated to each other to form a cross slot; a rear end of the fixing seat is provided with a first slot body 411 which corresponds to the slot I and allows the limiting plate to enter, and a rear end of the slide block is provided with a second slot body 440 which corresponds to the slot II and allows the limiting plate to enter; an axis body is rigidly connected in the second slot body, and a clamping block is formed; the axis body is parallel to a rotation axis of the limiting plate; and in order to improve the structural strength, the axis body in this example is made of metal.

In order to enhance the aesthetic of the structure at the same time, in this example, a cross section of the shift block is arc-shaped, and a shift part 422 that protrudes rearward and upward is arranged at an upper end of the shift block.

In order to enable the stand to adapt to different vehicle models, the length (height) of the support rod in this example is adjustable. The support rod includes a lower support rod 2 and an upper support rod 3, both the lower support rod and the upper support rod are rectangular hollow tube bodies, and the upper support rod is sleeved on the lower support rod 2 and fixed through a locking bolt. During adjusting, the locking bolt is loosened, the upper support rod is adjusted to a suitable height, and then, the locking bolt is tightened.

Figure 6:
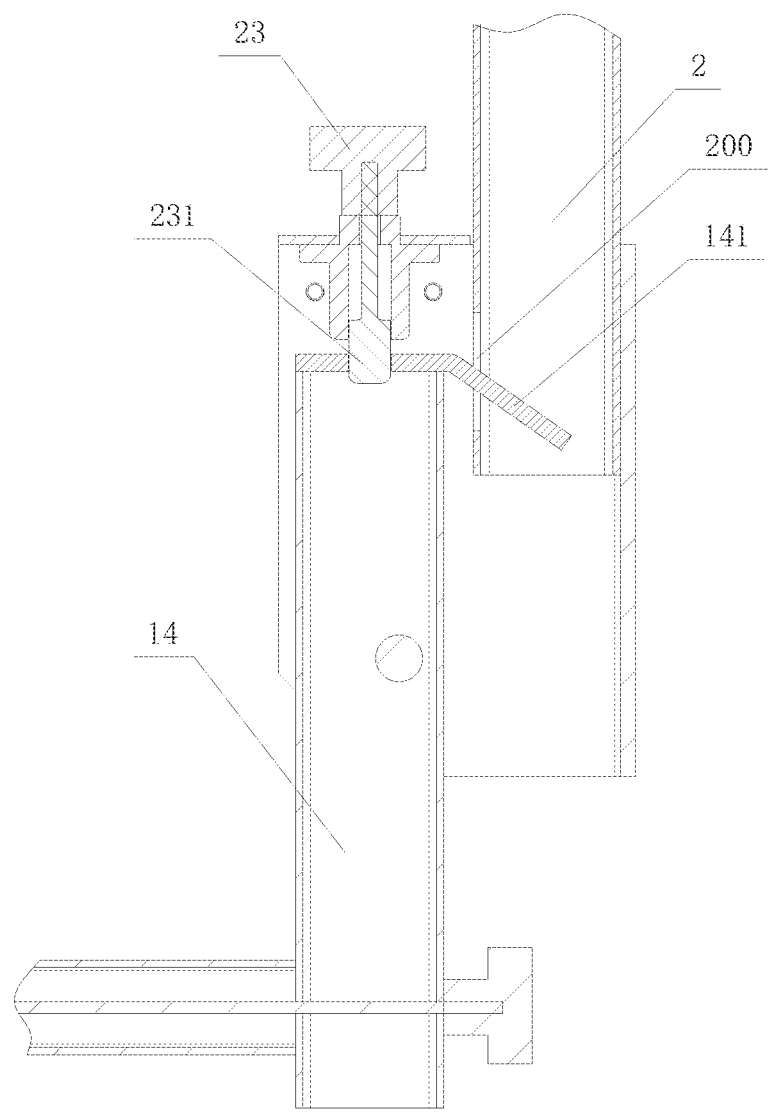
FIG. 6 is a schematic structural view of a support seat of the vehicle-mounted bicycle stand of the disclosure.
Figure 7:
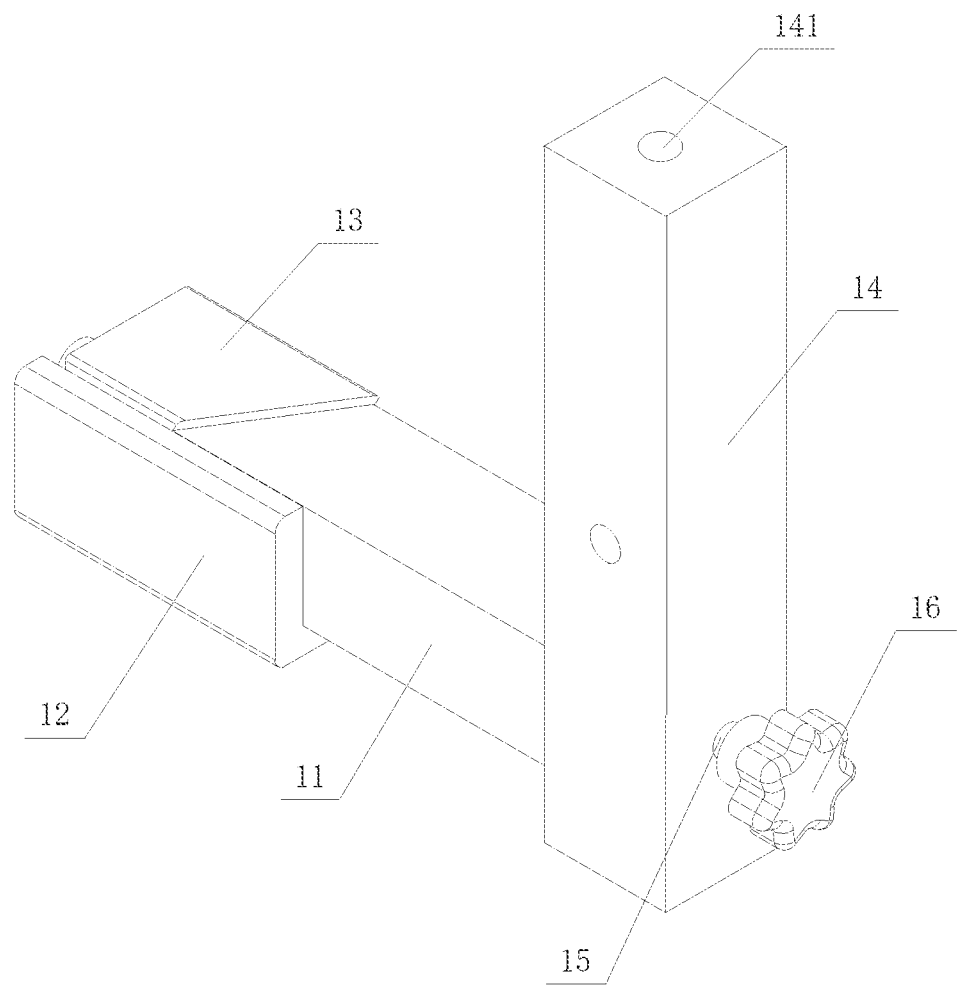
FIG. 7 is a schematic structural view of a mounting seat of the vehicle-mounted bicycle stand of the disclosure.
Figure 8:
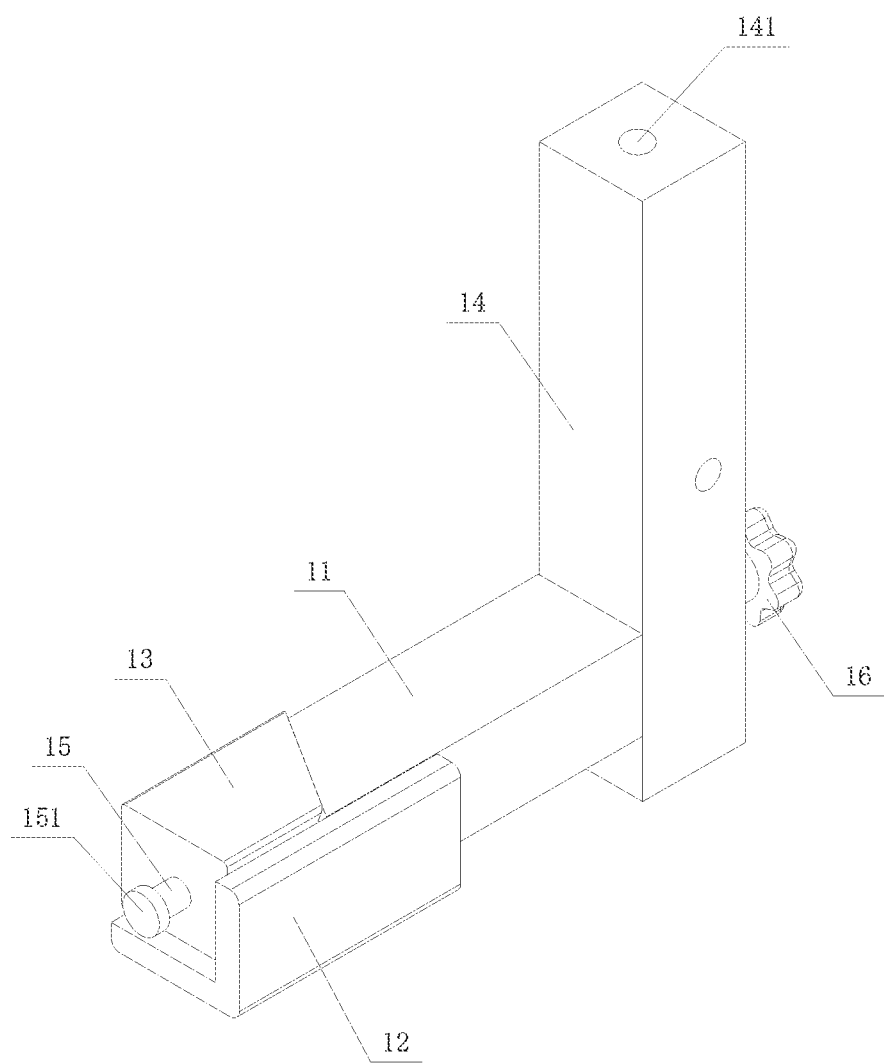
FIG. 8 is a schematic structural view of another perspective of the mounting seat of the vehicle-mounted bicycle stand of the disclosure.
Figure 9:
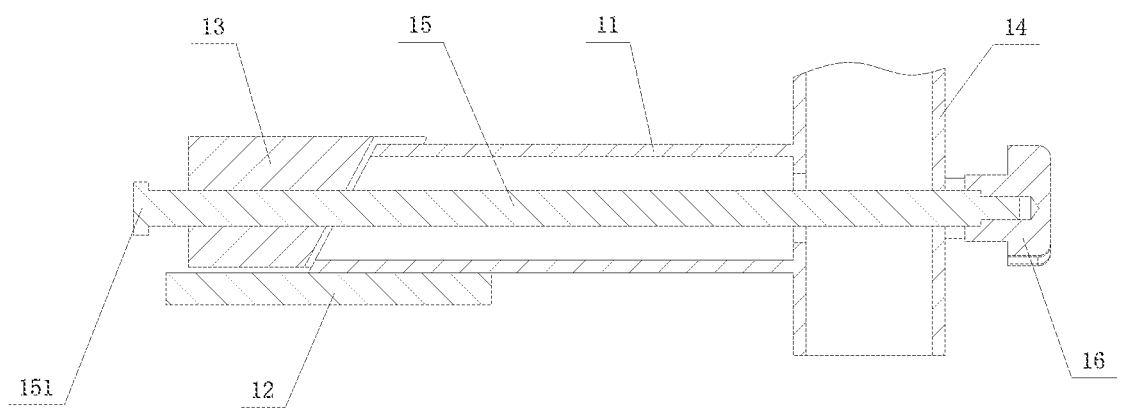
FIG. 9 is a cross-sectional view of a connecting part of the vehicle-mounted bicycle stand of the disclosure.
Figure 10:
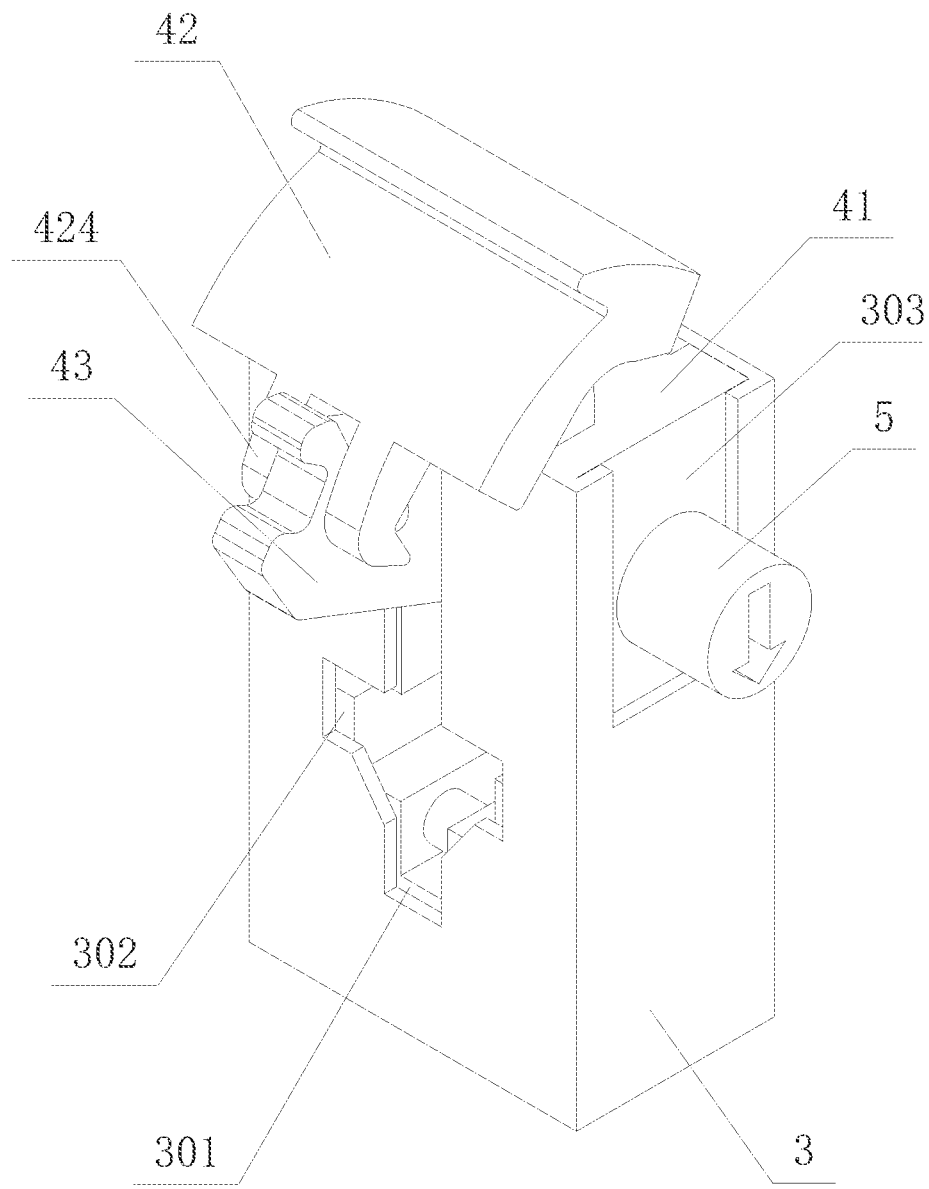
FIG. 10 is a schematic state view of a locking and fixing mechanism when the vehicle-mounted bicycle stand of the disclosure is folded.
Figure 11:
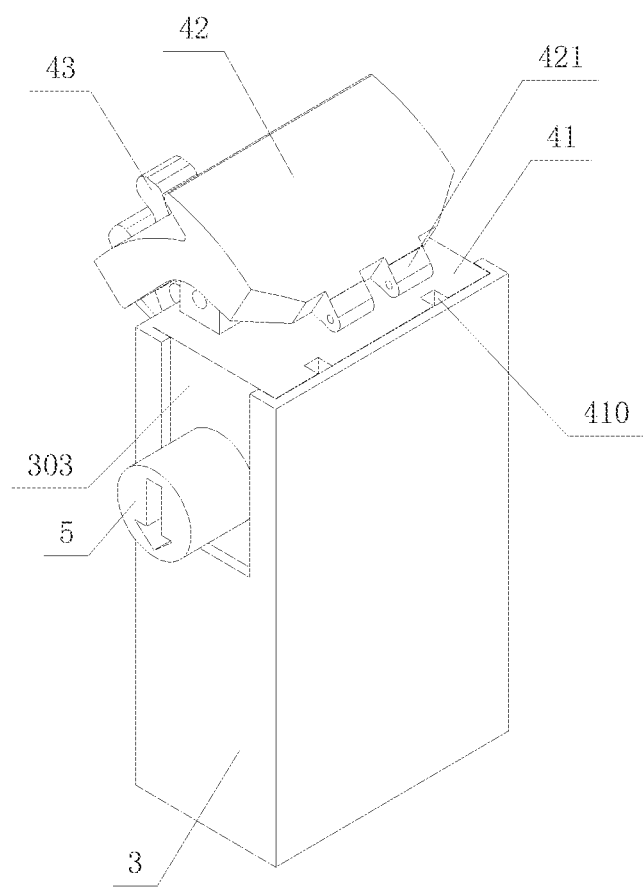
FIG. 11 is a schematic state view of another perspective of the locking and fixing mechanism when the vehicle-mounted bicycle stand of the disclosure is folded.

In order to facilitate the placement of the bicycle, in this example, the support rod can be rotated rearward to lower the position of the bracket. In this example, the rotation angle is greater than or equal to 10 degrees and less than or equal to 60 degrees. Referring to FIG. 1 to FIG. 6, a support seat 21 is fixed at a bottom of the support rod, and the support seat 21 is rotationally mounted on a connecting rod 14 on the mounting seat 1; after assembly, the support rod is located at a front end of the connecting rod; a rotation direction of the support seat 21 faces an unfolded direction of the bracket 5, that is, the support seat is rotated rearward; the support seat 21 is elastically connected with a clamping pin 231 and a second elastic component for enabling the clamping pin 231 to have a trend of moving towards the connecting rod 14; and the connecting rod 14 is provided with a pin hole 141 for insertion of the support rod when the support rod is rotated to a support state (vertical state). In this example, the clamping pin 231 is mounted on a top of the support seat 21, a sliding direction of the clamping pin is parallel to a length direction of the support rod, a top of the clamping pin 231 is provided with a pull block 23 or a pull rod for shifting the clamping pin to move upward, the pull block or the pull rod can pull the clamping pin to overcome the second elastic component and move upward, and then, the lower end of the clamping pin is detached from the pin hole 141 formed in the top of the connecting rod 14, so that the support rod can be rotated. When a pin shaft is inserted into the pin hole, the mounting seat and the support rod are fixedly connected to realize support. In order to avoid the influence on placement of the bicycle due to a too large rotation angle of the support rod, a limiting component is arranged between the connecting rod 14 and the support seat 21 or between the connecting rod and the support rod, and the limiting component is configured to limit a rearward rotation angle of the support rod. Referring to FIG. 6, a top plate is fixed on the top of the connecting rod 14, the pin hole 141 is formed in the top plate, one end of the top plate extends rearward and forms a first limiting part 142, the first limiting part is bent downward by 30-40 degrees, the front end of the side wall of the support rod (located in the support seat 21) is provided with a limiting slot 200, the first limiting part is penetrated in the limiting slot 200, the rotation angle of the support rod depends on the height of the limiting slot (the length direction of the support rod), and when the support rod is rotated to a limit position, the first limiting part is in contact with an end of the limiting slot to realize angle limiting.

A front end of the upper support rod is provided with a plastic cover 32 for improving the aesthetics, and furthermore, product-related marks may also be set. A side wall of the plastic cover is provided with a handlebar 321 for lifting or rotating the support rod or other operations.

A use method of the vehicle-mounted bicycle stand of the disclosure is described below:

Mounting: the direction of the stand is adjusted to enable the stand to be in a vertical state as a whole, the bracket 5 is located at the upper end, the insertion rod 11 at the front end of the mounting seat 1 is aligned to the mounting hole on the square-opening base at the rear of the vehicle and horizontally inserted into the mounting hole forward until the insertion rod 11 is completely inserted into the mounting hole, the tightening part 16 at the rear end of the mounting seat 1 is tightened to enable the support block 13 at the front end of the insertion rod 11 to move forward under the acting force of the screw rod and move away from the support plate 12 by the inclined guide of the inclined surface, the support block 13 and the support plate 12 move outward in a diagonal manner until the inner walls of the mounting hole are completely pressed so as to realize the mounting and fixing of the bicycle stand, two surfaces of the support plate are in contact with two inner walls of the mounting hole, two surfaces of the support block 13 are in contact with the other two inner walls of the mounting hole, that is, the connecting part of the mounting seat is tensioned on the four inner walls of the rectangular mounting hole, the contact area is large, the support force is balanced and stable, and the bicycle stand is firmly mounted at the rear end of the vehicle.

Placement of Bicycle:

S1: the pull block 23 at the upper end of the support seat 21 is pulled to move upward to enable the clamping pin 231 to be detached from the pin hole in the top of the connecting rod 14, then the rotation of the support rod can be realized, and the support rod is rotated rearward by a certain angle under the limiting of the limiting component;

S2: the shift block 42 is rotated rearward to enable the clamping hooks 424 at the rear end of the shift block to be detached from the limiting bosses on the limiting plate 43, the limiting plate 43 can be rotated freely after losing the restraint of the clamping hooks, the bracket is rotated rearward to a support state, and the limiting plate rotates synchronously; when the limiting plate 43 is rotated downward, the inclined guide surface 431 is in contact with the clamping block 441 arranged on the slide block 44, and under the pushing force of the inclined guide surface, the slide block moves downward until the clamping block 441 is clamped in the clamping slot 430 of the limiting plate; and the first elastic component enables the clamping block to be clamped in the clamping slot 430 to realize the locking and fixing of the bracket;

S3: the bicycle (frame) is placed on the mounting seat (not shown in the figure) of the bracket 5 and fixed; and S4: the support rod is rotated forward to enable the support rod to be in a vertical state as a whole, and when the support rod is rotated to a limit position, the clamping pin 231 is inserted into the pin hole in the top of the connecting rod so as to realize the fixing of the support rod.

The placement and fixing of the bicycle are completed according to the above steps.

After the vehicle reaches the destination, the bicycle is dismounted according to the following steps:

S5: S1 is repeated to put down the support rod so as to facilitate the dismounting of the bicycle;

S6: the shift block 42 is rotated rearward, the slide block linked with the shift block moves downward to enable the clamping block on the slide block to be detached from the clamping slot on the limiting plate, the limiting part can be rotated freely after losing the restraint, the bracket is folded, the limiting plate rotates synchronously until the limiting plate is connected with the clamping hooks to realize locking, and at this time, the bracket is in a folded state substantially parallel to the support rod; and S7: S4 is repeated, the support rod is adjusted to a vertical state, and at this time, the bicycle stand is in an idle state.

In the vehicle-mounted bicycle stand of the disclosure, by arranging a support block and a support plate, the tensioning force is large, the connection is stable and reliable, and the bicycle stand can be reliably mounted on the square-opening base at the rear end of the vehicle; by the operation of a screw rod and a tightening part arranged at the front end, the operation is convenient and labor-saving, and a self-locking function is realized; by a bent support rod structure, when a bicycle is mounted or dismounted, the support rod is rotated rearward, so that the height of the bicycle is reduced, the operation space is increased, the mounting and dismounting of the bicycle are convenient, and the mounting and dismounting of the bicycle are more labor-saving; by a telescopic support rod structure, the height of the support rod can be adjusted according to needs to adapt to bicycles of different specifications and sizes, so that the application scope is wide; by arranging a limiting structure, the support rod is prevented from exceeding a stroke during rotation to improve safety and reliability, and the bicycle is prevented from directly hitting the ground due to gravity when the support rod is rotated; a foldable bracket structure is folded when the bicycle is not placed, so that the occupied space is reduced; a locking and fixing mechanism is arranged to lock and fix the bracket in an unfolded state or a folded state to avoid rotation, so that the safety and reliability during running are improved; and by arranging a shift block structure, the operation is convenient and labor-saving, and the appearance is beautiful. The vehicle-mounted bicycle stand of the disclosure is compact in structure, convenient and labor-saving in mounting and dismounting, high in overall structural strength, and good in reliability.

The above are only the preferred implementations of the disclosure. It should be noted that those of ordinary skills in the art can make several improvements and modifications without departing from the technical principle of the disclosure, and these improvements and modifications should also be considered within the protection scope of the disclosure.

What is claimed is:

1. A vehicle-mounted bicycle stand, comprising:
   a mounting seat (1) connected with a square-opening base at a rear end of a vehicle, wherein a connecting part is arranged at an end of the mounting seat (1);
   a support rod fixed on the mounting seat (1);
   a bracket (5) rotationally mounted at an upper end of the support rod and configured to place a bicycle; and
   a locking and fixing mechanism mounted between the support rod and the bracket (5) and configured to lock and fix the bracket (5) in a rearward unfolded state or a downward folded state;
   wherein the locking and fixing mechanism comprises a main shaft, a shift block (42) and a slide block (44); the main shaft is rotationally mounted at the upper end of the support rod, the main shaft is rigidly connected with a limiting plate (43), two ends of the main shaft are bent to the same side to form the bracket (5), and an end of the limiting plate (43) is provided with a clamping slot (430) with an opening facing away from the main shaft; the shift block (42) is rotationally mounted on a top of the support rod, the shift block (42) is connected with the slide block (44) in vertical slide fit with a lower end of the main shaft, and the slide block (44) can be driven to slide up and down through the rotation of the shift block (42); when the limiting plate (43) is rotated to a lower limit position, a clamping block (441) arranged on the slide block (44) can be clamped in the clamping slot (430) to realize the locking of the bracket in an unfolded state; and the locking and fixing mechanism is provided with a first elastic component for enabling the shift block (42) to have a trend of rotating rearward and driving the slide block (44) to move upward, or enabling the slide block (44) to have a trend of moving upward and driving the shift block (42) to rotate rearward.

2. The vehicle-mounted bicycle stand according to claim 1, wherein the connecting part comprises an insertion rod (11), a support block (13) and a screw rod (15); the insertion rod (11) is arranged horizontally forward and can be inserted into the square-opening base at the rear end of the vehicle, a support plate (12) is fixed on a side wall of an end of the insertion rod (11), the support block (13) is located at the end of the insertion rod (11), a contact surface between the support block (13) and the end of the insertion rod (11) is an inclined surface, screw holes for allowing the screw rod (15) to pass through are penetrated in the support block (13), a head of the screw rod (15) passes through the insertion rod (11) forward and extends to the outside of the mounting seat (1), and a tightening part (16) is fixed at an end of the screw rod; and when the tightening part (16) is rotated, the screw rod (15) can be driven to rotate, and the support block (13) can move forward and away from the support plate (12), so that the connecting part is tensioned and fixed in the square-opening base.

3. The vehicle-mounted bicycle stand according to claim 2, wherein a cross section of the support plate (12) is L-shaped, and an intersecting line of the inclined surface and a side wall of the support plate (12) is inclined to a length direction of the support plate (12).

4. The vehicle-mounted bicycle stand according to claim 3, wherein included angles between intersecting lines of the inclined surface and two side walls of the support plate (12) and the length direction of the support plate are the same.

5. The vehicle-mounted bicycle stand according to claim 2, wherein a tail of the screw rod (15) is provided with a limiting protrusion (151) for preventing the support block (13) from being detached.

6. The vehicle-mounted bicycle stand according to claim 1, wherein a rotation axis of the shift block (42) is parallel to a rotation axis of the main shaft, clamping hooks (424) are arranged at a rear end of the shift block (42), the first elastic component enables the clamping hooks (424) to have a trend of moving downward, and limiting bosses (432) are arranged on side walls of the limiting plate (43); and when the bracket (5) is rotated to a folded state, the limiting plate (43) is rotated to a rear limit position, and the limiting bosses (432) are hooked by the clamping hooks to realize the locking of the main shaft.

7. The vehicle-mounted bicycle stand according to claim 6, wherein an end of the limiting plate (43) is provided with an inclined guide surface (431) configured to be in contact with the clamping block (441) and push the slide block to move down.

8. The vehicle-mounted bicycle stand according to claim 1, wherein the locking and fixing mechanism further comprises a fixing seat (41) fixed at the upper end of the hollow support rod, the shift block (42) is rotationally mounted on a top of the fixing seat (41), a front end of the shift block (42) is provided with connecting lugs (421), the connecting lugs (421) are hinged with a connecting holder (45), and the connecting holder (45) passes through the fixing seat (41) downward and then is hinged with the slide block (44).

9. The vehicle-mounted bicycle stand according to claim 1, wherein a support seat (21) is fixed at a bottom of the support rod, the support seat (21) is rotationally mounted on a connecting rod (14) on the mounting seat (1), a rotation direction of the support seat (21) faces an unfolded direction of the bracket (5), the support seat (21) is elastically connected with a clamping pin (231) and a second elastic component for enabling the clamping pin (231) to have a trend of moving towards the connecting rod (14), and the connecting rod (14) is provided with a pin hole (141) for insertion of the support rod when the support rod is rotated to a vertical state.

10. The vehicle-mounted bicycle stand according to claim 9, wherein the clamping pin (231) is mounted on a top of the support seat (21), a sliding direction of the clamping pin is parallel to a length direction of the support rod, and a top of the clamping pin (231) is provided with a pull block (23) for shifting the clamping pin to move upward to enable the clamping pin to be detached from the pin hole (141) formed in a top of the connecting rod (14).

11. The vehicle-mounted bicycle stand according to claim 9, wherein a limiting component for limiting a rearward rotation angle of the support rod is arranged between the connecting rod (14) and the support seat (21) or the support rod.

12. The vehicle-mounted bicycle stand according to claim 11, wherein a top plate is fixed on the top of the connecting rod (14), the pin hole (141) is formed in the top plate, one end of the top plate extends rearward and forms a first limiting part (142), and the support rod or the support seat (21) is provided with a limiting slot (200) for allowing the first limiting part to be inserted and limiting a rotation angle.

13. The vehicle-mounted bicycle stand according to claim 9, wherein the rotation angle of the support rod is greater than or equal to 10 degrees and less than or equal to degrees.

14. The vehicle-mounted bicycle stand according to claim 1, wherein the length of the support rod is adjustable, the support rod comprises a lower support rod (2) and an upper support rod (3), and the upper support rod is sleeved on the lower support rod (2) and fixed through a locking bolt.

15. The vehicle-mounted bicycle stand according to claim 1, wherein a cross section of the support rod is rectangular.

16. The vehicle-mounted bicycle stand according to claim 8, wherein the connecting holder (45) is of a frame-shaped holder structure formed by bending steel wires.

* * * * *